United States Patent
Apsell et al.

(10) Patent No.: US 6,292,724 B1
(45) Date of Patent: Sep. 18, 2001

(54) METHOD OF AND SYSTEM AND APPARATUS FOR REMOTELY MONITORING THE LOCATION, STATUS, UTILIZATION AND CONDITION OF WIDELY GEOGRAPHICALLY DISPRESED FLEETS OF VEHICULAR CONSTRUCTION EQUIPMENT AND THE LIKE AND PROVIDING AND DISPLAYING SUCH INFORMATION

(75) Inventors: Sheldon Apsell, Newton; Carlos A. Barberis, Haverhill; Thomas Alborough, Bellingham; George Shinopoulos, Manchester; Steven Rothman, Bolton, all of MA (US)

(73) Assignee: Micrologic, Inc., Westborough, MA (US)

( * ) Notice: Subject to any disclaimer, the term of this patent is extended or adjusted under 35 U.S.C. 154(b) by 0 days.

(21) Appl. No.: 09/416,604

(22) Filed: Oct. 12, 1999

(51) Int. Cl.$^7$ .................................................. G06F 165/00
(52) U.S. Cl. ............................ 701/29; 701/200; 701/213; 73/178 R
(58) Field of Search .............................. 701/29, 200, 213; 73/178 R

(56) References Cited

U.S. PATENT DOCUMENTS

| | | | |
|---|---|---|---|
| 5,619,412 | * 4/1997 | Hapka | 701/36 |
| 5,796,728 | * 8/1998 | Rondeau et al. | 370/338 |
| 5,815,071 | * 9/1998 | Doyle | 340/439 |
| 5,926,745 | * 7/1999 | Threadgill et al. | 455/12.1 |
| 6,032,084 | * 2/2000 | Anderson et al. | 700/241 |
| 6,047,234 | * 4/2000 | Cherveny et al. | 701/200 |
| 6,154,658 | * 11/2000 | Caci | 455/466 |

* cited by examiner

Primary Examiner—William A. Cuchlinski, Jr.
Assistant Examiner—Olga Hernandez
(74) Attorney, Agent, or Firm—Rines and Rines

(57) ABSTRACT

A novel method of and system for remotely monitoring location, status, utilization and condition of a widely geographically dispersed fleets of vehicular construction equipment, using the resources of satellite positioning and communication and Internet facilities, and processing and displaying such information for fleet managers and the like.

17 Claims, 4 Drawing Sheets

| | Low | Med | Low=R/B |
|---|---|---|---|
| 56 day avg. | 2 | 6 | R |
| 28 day avg. | 2 | 6 | R |
| 7 day avg. | 2 | 6 | R |
| 3 day avg. | 2 | 6 | R |
| 56=>28 day trend | 0 | 1 | R |
| 28=>7 day trend | 0 | 1 | R |
| Total run hrs | 1000 | 10000 | R |
| Fuel level | 3/16 | 12/16 | R |
| Battery Volts | 11.5 | 12.0 | R |

Set Colorizer Cutpoints

OK  Cancel  Set To Defaults

FIG. 3

Isolated Ciruit (Note: Control lines are dotted.)

METHOD OF AND SYSTEM AND APPARATUS FOR REMOTELY MONITORING THE LOCATION, STATUS, UTILIZATION AND CONDITION OF WIDELY GEOGRAPHICALLY DISPRESED FLEETS OF VEHICULAR CONSTRUCTION EQUIPMENT AND THE LIKE AND PROVIDING AND DISPLAYING SUCH INFORMATION

FIELD OF INVENTION

The present invention is broadly concerned with keeping track of the location, status, degree of utilization and condition and operability of widely geographically dispersed fleets of vehicular construction equipment and the like, using the resources of satellite positioning and communication Internet facilities; the invention being more particularly concerned with providing the fleet owner with the capability of utilizing such information, suitably processed, on periodically provided schedule, or upon specific request, to monitor and improve fleet utilization, efficiency, and cost-effectiveness.

BACKGROUND

It has previously been proposed to keep track of vehicular construction equipment and the like by providing the vehicles with transponders receiving GPS location information and supplying the same via an Internet web page, or otherwise, to the equipment owner. Currently, for example, transponder and communications link equipment for effecting such operation is offered by Orbcomm USA limited partnership company, of the satellite provider Orbital Sciences Corp. The Caterpillar Company is also believed similarly to monitor such information and, through appropriate sensor(s) at the equipment, indicating also such utilization information as run-time to enable the timely Orbcomm offering of spare parts.

The present invention, however, is more specifically concerned with providing continuing information to fleet owners, such as construction companies, or those who rent for utilization by customers, by more fully remotely sensing the equipment utilization and operating condition data, run hours, fuel level, battery voltage, engine pressure, water level and other conditions, —sufficient, indeed, when processed, to enable the owners or managers to monitor and improve the efficiency of utilization of their high capital cost equipment, or to enable the equipment renter adequately to bill for all the use that actually occurs and, additionally, to minimize the downtime in rental contracts. The invention also enables supplying anticipatory maintenance and fuel requirement information—insuring against run out or over supply—and monitoring for inefficient, abusive or unauthorized locational usage—on site too early or too long, or unauthorizedly moved or used after hours, or off site—in short, providing managers, through appropriate software signal processing and upon user-friendly displays, with information needed to operate the fleets more efficiently by reducing expenses or increasing rental revenue.

While preferably using Internet linking, moreover, the invention enables the transponders provided on the vehicular equipment to send information to the satellite, which relays responses to a ground station and over the Internet to an information processing-service-providing headquarters or center which, in turn, processes the information and provides such, again as by way of the Internet or otherwise, to the fleet manager or other customer.

The invention provides the facility, moreover, in addition to providing such information reports on a standard mode of reporting schedule, say daily, for example, to enable the customer to request of the headquarters a special report at any time (a so-called-interrogation or express-inquiry mode), wherein a headquarters center requests the ground station to send a signal to the satellite to trigger the transponder for such a special report. And, as earlier mentioned, the invention may further provide operation in an alarm mode, sensitive to unauthorized conditions, such as the moving or use of the equipment after hours or at another site, and the like, and triggering the transponders.

Thus, while not a real-time tracking system, the system of the invention can adequately provide the fleet manager with all the basic information needed remotely to track and monitor the operation of the fleet and to improve efficiency of equipment utilization and operation. In addition, the facility is provided for the manager to select or request different options on limits or information parameters or items for selective display, and such may be discriminatingly color-coded on the display.

OBJECTS OF INVENTION

The primary object of the present invention, accordingly, is to provide a new and improved method of and system and apparatus for remotely monitoring several or all of the location, status, utilization and condition of widely geographically dispersed fleets of vehicular construction equipment and the like, providing, unlike previous satellite-transponder systems before-described, totally adequate and processed signal information for enabling the continual improving of the efficiency and economic return on the utilization of the equipment by managers monitoring user-friendly displays.

A further object is to provide such a novel system wherein equipment status information is provided in one or more of a standard periodic information data-reporting mode, an interrogation mode at any time, and an alarm mode.

Still another object is to provide in such information, a reading of the fuel level in the equipment even when the equipment is shut down.

An additional object is to enable the display of signal-processed information options or items or parameter limits selected by the manager and presentable in different distinctive color-coded displays.

Other and further objects are also later pointed out and are hereinafter more particularly delineated in the appended claims.

SUMMARY

In summary, however, from one of its broader aspects, the invention embraces in a vehicular equipment transponder-satellite communications link system wherein information sent by the transponders of vehicular equipments of a widely geographically dispersed fleet of equipments is relayed by the satellite to a ground station and then via the Internet to an information-processing center, a method of providing processed information as to several or all of the locations, utilizations, status and conditions of the vehicular equipments and in sufficient detail to enable efficiency management of the equipment, that comprises, inputting to the transponder at each equipment of the fleet, locally sensed parameter data such as temperature, run hours, fuel level, battery voltage and other equipment engine parameters; upon each equipment transponder receiving GPS signals from navigation satellites, causing the transponder to transmit to communication satellites information as to its location and as to said locally sensed data; relaying said information from the communications satellite to a ground station and thence, via the Internet, to said center; signal-processing the related information at the center to adapt it for one or more of graphical and tabular location display of the widely dispersed equipments and/or of optionally selected equipments, and optionally selected parameters, limits and conditions of such equipments, to provide processed information suitable to exercise management analysis of equipment utilization and operational efficiency; and communicating such processed information to the fleet manager for enabling improving said efficiency of utilization and operation.

Novel fuel monitoring and special item option color display features are also involved.

Preferred and best mode embodiments and designs are hereinafter disclosed and detailed in connection with the description of the operation of the system.

DRAWINGS

The invention will now be described in connection with the accompanying drawings, FIG. 1 of which is a schematic representation of the overall system of the invention in preferred form;

FIG. 3 is a representation of the dialog used to set different data display colors and the breakpoints therefor.

DESCRIPTION OF THE PREFERRED
EMBODIMENT OF INVENTION

Figure 1:
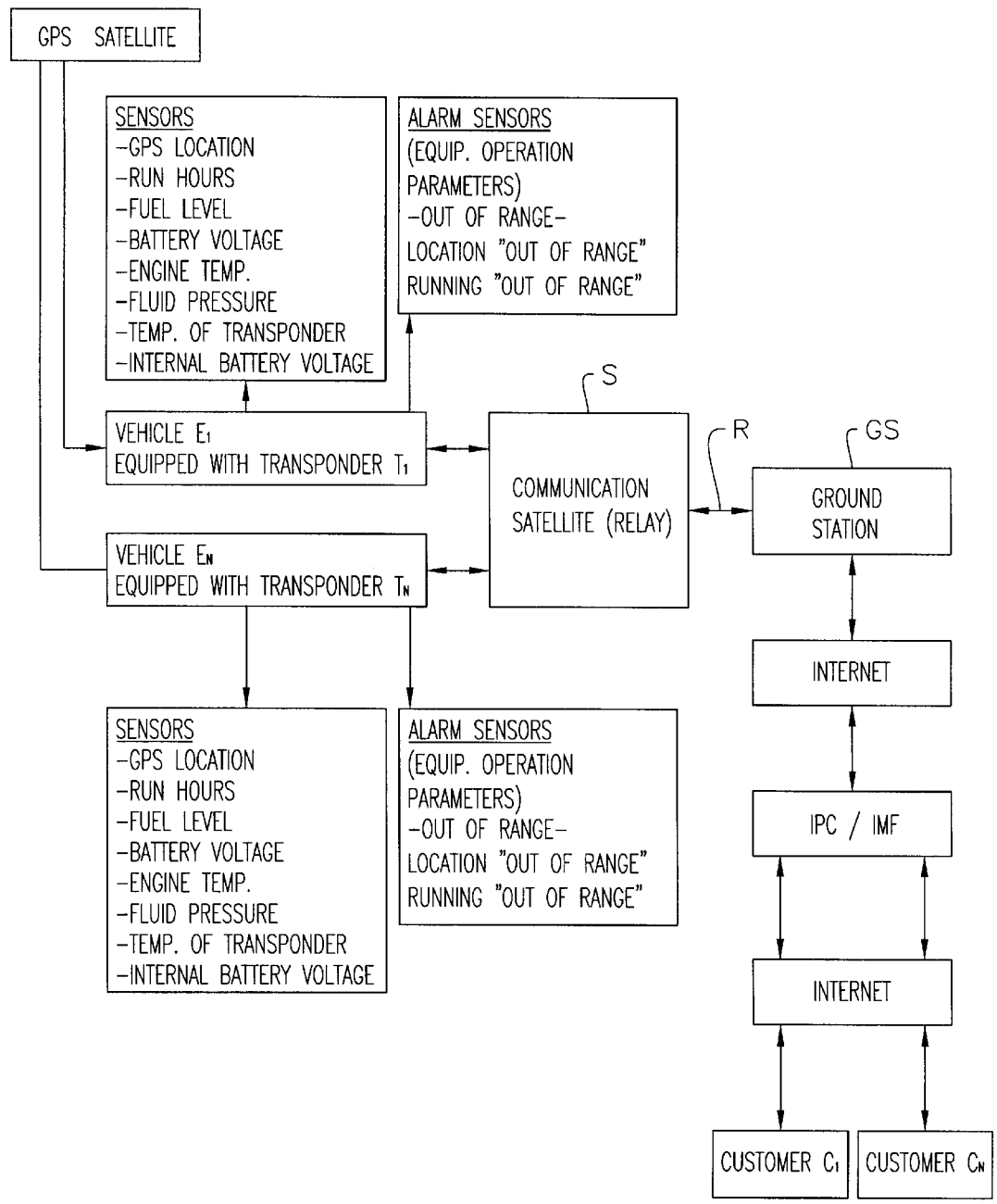

In FIG. 1, the overall system and method of the invention is diagrammatically illustrated, implemented as a vehicular equipment transponder-satellite communication link system wherein information sent by the transponders $T_1 \ldots T_N$ of respective vehicular equipments $E_1 \ldots E_N$ of a widely geographically dispersed fleet of equipments is relayed by a communications satellite S to a ground station GS and thence via the Internet to an information-processing center IPC, sometimes herein called an information management facility IMF. The transponders provided on each piece of fleet equipment collect postional data from a GPS unit, and equipment operating data from sensors at the equipment on the condition of the equipment, and send such to the communications satellite(s) and thence relayed to the ground-based wireless system GS. From the station GS, the information is sent as over the Internet, to the IPC (IMF). The center IPC (IMF) then processes the information as to several or all of the locations, utilizations, status and conditions of the vehicular equipments $E_1 \ldots E_N$ and in sufficient detail to enable efficiency management of the equipments by the ultimate customers $C_1 \ldots C_N$. The before-mentioned sensors (so-labeled), input to the transponders at each equipment of the fleet, locally sensed parameter data such as temperature, run hours, fuel level, battery voltage, fluid processing and other equipment engine and transponder parameters. Upon each equipment transponder $T_1 \ldots T_N$ receiving positional GPS signals from navigation GPS satellites (takes 3 min, for sending), the transponder transmits to the communications satellite S information as to its location and as to this locally sensed data. The satellite S, in turn, relays this information, as at R, from the satellite to the ground station GS and thence, as before stated, via the Internet to the center IPC (IMF), where signal-processing means at the center adapts or conditions the relayed information for one or more of geographical and tabular location display of the widely dispersed equipments and/or for optionally selected equipments, and optionally selected parameters, limits and conditions of such equipments, to provide processed information suitable to exercise management analysis of equipment utilization and operational efficiency—communicated, again over the Internet or otherwise, to the fleet manager customers $C_1 \ldots C_N$ for enabling improving said efficiency of utilization and operation.

Figure 2:
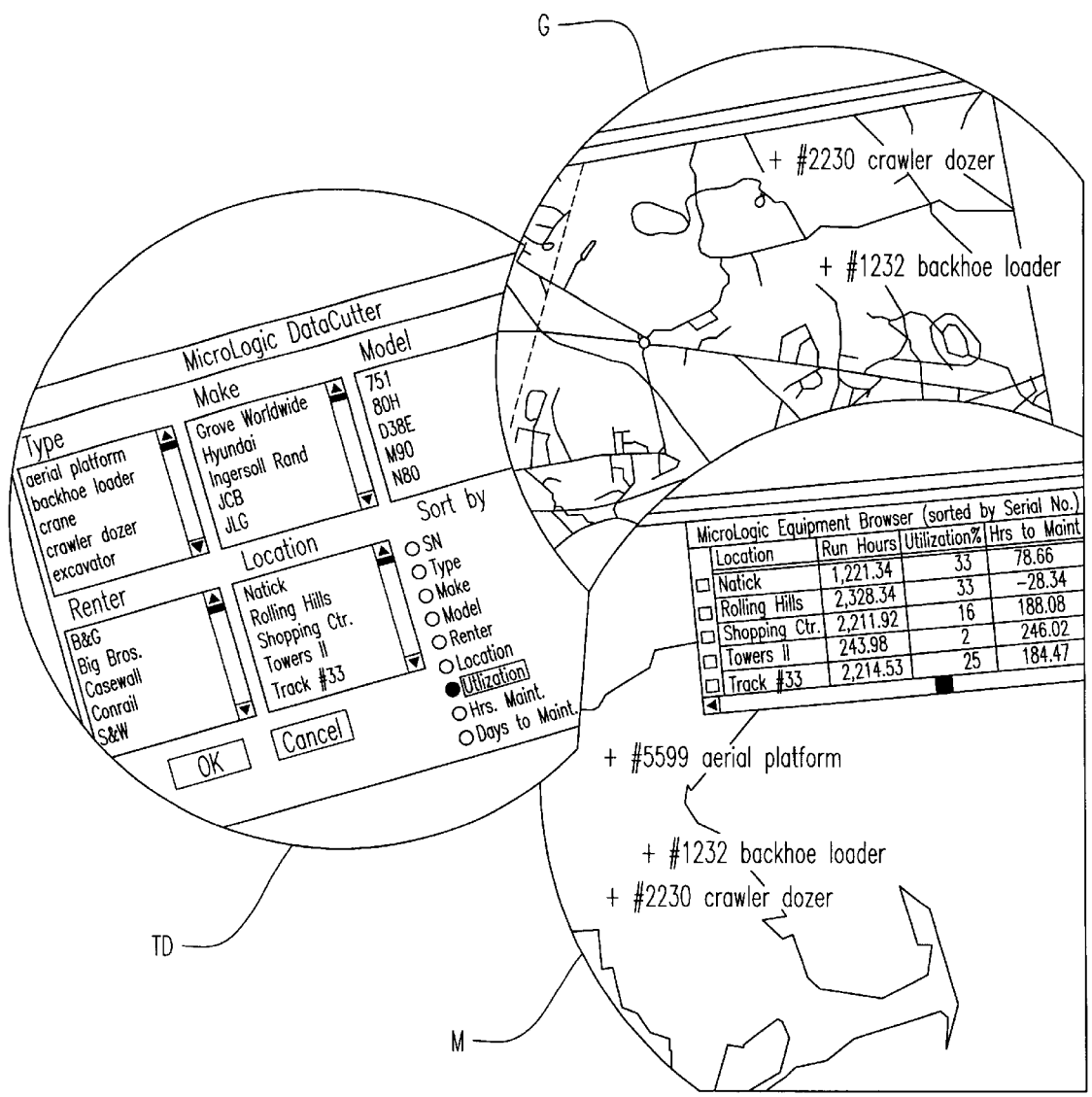
FIG. 2 shows typical equipment-monitoring processed data supplied to customers in various display formats.

Examples of such software-implemented display are shown in FIG. 2 wherein equipment type-make-model-user and location are tabularly presented at TD, geographical distribution at G, and run hours and hours to maintainence presented at M, providing interactive maps and reports in, for example, an illustrative Windows environment, based on the continuing flow of processed information.

In accordance with a preferred embodiment of the invention, means is provided for displaying the selected equipments and/or selected parameters and conditions thereof, etc. in different distinctive colors. In the representation of FIG. 3, there is presented a typical dialog used in accordance with the invention to set the color in accordance with data breakpoints for different color presentations. For each of the parameters (56 day average, 28 day average, as illustrated etc.) the breakpoint between "low" and "medium" and the breakpoint between "medium" and "high" are set. The medium color may be yellow. The other two colors are red (R) and blue (B). The third column on the dialog controls whether lows are red or blue; and the high values, are automatically the other. Thus the invention enables the customer to set some limits and or any of the parameters, or other choices; and then, in distinctive color, display the equipment(s) that meets that criteria. As an example, a manager may want to see in red all the equipment that has been used less than half an hour a day. A yellow display may be used to show use between a half-hour and two hours; and green, to show equipments used more than two hours a day. For maintenance, as another illustration, a red display may show all equipments overdue for maintenance based upon the run-hours schedule; yellow, to show all equipments requiring maintenance during the next week; and green, the equipments with later maintenance schedules. Colors may also be used to distinguish other display categories as well.

As before described, one of the important equipment conditions to be monitored is vehicle fuel level. It is important, moreover, to be able to read the fuel level not only during running of the equipment, but also when the equipment is not running, as for the purpose of determining whether to send the fuel truck out, and, if so, how much fuel is needed. A problem with such measurement when the engine is not running, however, resides in the fact that the turning off of the master power switch disconnects the battery negative ground, leaving everything at floating potential and disconnected from the chassis. In accordance with the invention, this problem is solved by very briefly disconnecting the sensor temporarily from its normal connection, and using an isolated transformer to supply power to the sensor, so that when the sensor is floating, the transformer will float with it. Basically, the circuit is designed to use very little power when not taking a reading (microamps)—such reading, as of the order of 10's of milliamps, occurring in a couple of hundred milliseconds, and then shutting off the transponder powering. The circuit thus uses very little power when it is not sensing and, by careful design, minimizes the power needed when it is sensing.

Figure 4:
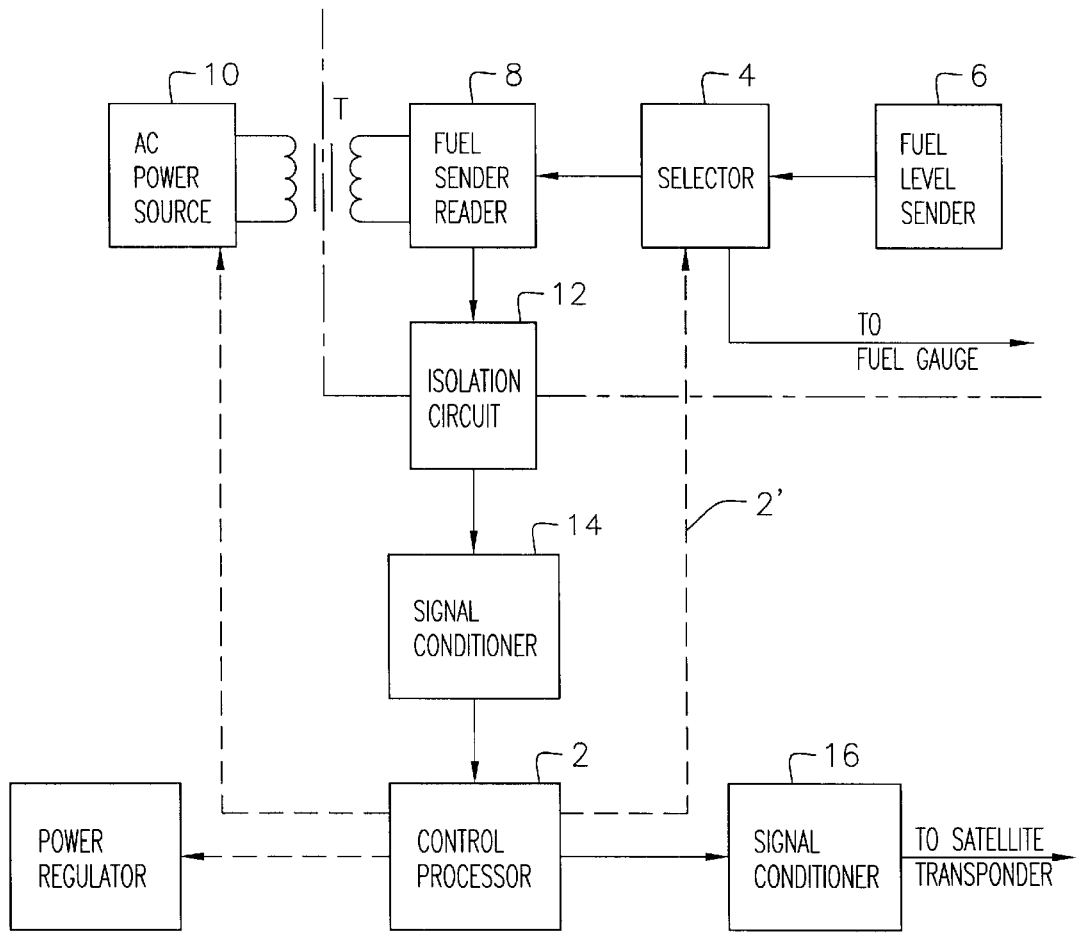
FIG. 4 is a block and circuit diagram of a preferred fuel level sensor circuit useful to provide such data on the fuel supply of the monitored equipment.

Details of a preferred design are shown in the block and circuit diagram of FIG. 4 which enables measuring the fuel level even when the equipment is not running (i.e. no power from the equipment), and on equipment in which the "master cutoff" switch disconnects the battery negative from the chassis or ground, causing the before-discussed fuel level sensor to "float". In order to satisfy the previously described goal of minimal power usage, the control processor 2 only turns on the circuits when a reading is to be taken— illustrated by the dash lines. The line $2^1$ to the selector 4 controls a switch, which determines whether the fuel level sendor 6 is connected to the equipment fuel gauge (so-labeled and representing normal operation), or the before-described fuel sensor reading (usually less than 1 second).

The basic concept of the circuit is that power is momentarily supplied to the sensor 8 through the transformer T, which provides isolation. The level may be read by sensing back through the transformer or by using opto-isolators 12. When it is desired to take a reading, the control processor 2 turns on the power source 10 and switches the selector 4 to the fuel sender reader 8. The signal is sent for the isolation circuit 12 and then "conditioned" at 14 (e.g. amplified, linearized), and applied to the control processor 2 where it can be saved. The control processor generates an output signal which is again conditioned at 16 and sent to the satellite transponder, so-labeled.

This circuit can operate in two ways. First, when the satellite transponder wants to transmit the value, it sends a signal to the control processor, which goes through the above steps and sends the value back to the transponder. The second way is that the control processor may read the level every so often (say every 10 minutes) and store it, and then sends the stored value to the transponder.

Returning to the system of FIG. 1, alarm sensors may also be provided, so-labeled, to activate the equipment transponder in the event of the development of alarm conditions such as operational parameters out of range or safe values, or out of prescribed ranges for equipment location or prescribed time periods of running, etc. Special request can also be made of the transponder and/or in satellite to provide such data (for example, signaling the satellite to interrogate or trigger the transponder), in addition to automatic periodically scheduled standard reports.

Through the techniques of the present invention, therefore, vehicular equipment fleet owners and renters are provided with better and continuing equipment asset management, enabling reduction in expensive transportation costs, preventing equipment overuse or unauthorized use, checking the status of the equipment (all from the customer's own PC), and aiding in locating misappropriated or stolen equipment. The invention, furthermore, enables higher equipment utilization through increasing equipment availability, obtaining utilization reports on demand, and enabling positioning or locating the right equipment in the right place and at the right time. The improved fleet maintenance obtained through use of the monitoring information services of the invention, furthermore, results from the ability to perform maintenance based on the real run-hours and not estimates; on the minimizing of major failures with customized alarms; and with the scheduling of drivers and technicians based on actual equipment locations.

Further modifications will also occurred to those skilled in this art and such are considered to fall within the spirit and scope of the invention as defined in the appended claims.

What is claimed is:

1. In a vehicular equipment transponder-satellite communications link system wherein information sent by the transponders of vehicular equipments of a widely geographically dispersed fleet of equipments is relayed by the satellite to a ground station and thence via the Internet to an information-processing center, a method of providing processed information regarding several or all of the locations, utilizations, status and conditions of the vehicular equipments and in sufficient detail to enable efficiency management of the equipment, that comprises, inputting to the transponder at each equipment of the fleet, locally sensed parameter data of one or more of temperature, run hours, fuel level, battery voltage and other equipment engine parameters; upon each equipment transponder receiving GPS signals, causing the transponder to transmit to the satellite information regarding its location and said locally sensed data; relaying said information from the satellite to a ground station and thence, via the Internet, to said center; signal-processing the related information at the center to effect it for one or more of graphical and tabular location display of the widely dispersed equipments and/or of optionally selected equipments, and optionally selected parameters, limits and conditions of said equipments, to provide processed information suitable to exercise management analysis of equipment utilization and operational efficiency; and communicating the processed information to the fleet manager for enabling improving said efficiency of utilization and operation, wherein the selected equipments and selected parameters and conditions thereof are distinctively displayed in different colors.

2. In a vehicular equipment transponder-satellite communications link system wherein information sent by the transponders of vehicular equipments of a widely geographically dispersed fleet of equipments is relayed by the satellite to a ground station and thence via the Internet to an information-processing center, a method of providing processed information regarding several or all of the locations, utilizations, status and conditions of the vehicular equipments and in sufficient detail to enable efficiency management of the equipment, that comprises, inputting to the transponder at each equipment of the fleet, locally sensed parameter data of one or more of temperature, run hours, fuel level, battery voltage and other equipment engine parameters; upon each equipment transponder receiving GPS signals, causing the transponder to transmit to the satellite information regarding its location and said locally sensed data; relaying said information from the satellite to a ground station and thence, via the Internet, to said center; signal-processing the related information at the center to effect it for one or more of graphical and tabular location display of the widely dispersed equipments and/or of optionally selected equipments, and optionally selected parameters, limits and conditions of said equipments, to provide processed information suitable to exercise management analysis of equipment utilization and operational efficiency; and communicating the processed information to the fleet manager for enabling improving said efficiency of utilization and operation, wherein the fuel level sensing is effected both when the equipment engine is running and when it is shut down.

3. In a vehicular equipment transponder-satellite communications link system wherein information sent by the transponders of vehicular equipments of a widely geographically dispersed fleet of equipments is relayed by the satellite to a ground station and thence via the Internet to an information-processing center, a method of providing processed information regarding several or all of the locations, utilizations, status and conditions of the vehicular equipments and in sufficient detail to enable efficiency management of the equipment, that comprises, inputting to the transponder at each equipment of the fleet, locally sensed parameter data of one or more of temperature, run hours, fuel level, battery voltage and other equipment engine parameters; upon each equipment transponder receiving GPS signals, causing the transponder to transmit to the satellite information regarding its location and said locally sensed data; relaying said information from the satellite to a ground station and thence, via the Internet, to said center; signal-processing the related information at the center to adapt it for one or more of graphical and tabular location display of the widely dispersed equipments and/or of optionally selected equipments, and optionally selected parameters, limits and conditions of said equipments, to provide processed information suitable to exercise management analysis of equipment utilization and operational efficiency; and communicating the processed information to the fleet manager for enabling improving said efficiency of utilization and operation, wherein the transponders are operated periodically to provide a standard mode reporting schedule.

4. The method of claim 3 wherein said communicating is effected over the Internet.

5. The method of claim 3 wherein such schedule is set for daily or several day reporting.

6. The method of claim 3 wherein, upon special request, a signal is sent to the satellite specially to interrogate the transponders.

7. The method of claim 3 wherein, upon sensing unsafe and/or unauthorized action at the transponders, they are activated in an alarm mode to notify the center.

8. The method of claim 7 wherein included in such unauthorized action are after-hours and off-site equipment use.

9. A vehicular equipment transponder-satellite communication link system wherein information sent by transponders of vehicular equipments of a widely geographically dispersed fleet of equipments is relayed by the satellite to a ground station and thence via the Internet to an information-processing center, the system comprising sensors for inputting to the transponders at each equipment of the fleet, locally sensed parameter data of one or more of temperature, run hours, fuel level, battery voltage and/or other equipment engine parameters; means operable upon each equipment transponder receiving GPS signals from the satellite, for causing the transponder to transmit to the satellite information as to its location and as to said locally sensed data; means for relaying said information from the satellite to a ground station and thence, via the Internet, to said center; signal-processing means at the center for processing the relayed information to effect one or more of geographical and tabular location display of the widely dispersed equipments and/or for optionally selected equipments, and optionally selected parameters, limits and conditions of such equipments, to provide processed information suitable to exercise management analysis of equipment utilization and operational efficiency; and means for communicating the processed information to the fleet manager for enabling improving efficiency of the equipment utilization and operation, wherein means is provided for displaying the selected equipments and selected parameters and conditions thereof in different distinctive colors.

10. A vehicular equipment transponder-satellite communication link system wherein information sent by transponders of vehicular equipments of a widely geographically dispersed fleet of equipments is relayed by the satellite to a ground station and thence via the Internet to an information-processing center, the system comprising sensors for inputting to the transponders at each equipment of the fleet, locally sensed parameter data of one of more of temperature, run hours, fuel level, battery voltage and/or other equipment engine parameters; means operable upon each equipment transponder receiving GPS signals from the satellite, for causing the transponder to transmit to the satellite information regarding its location and said locally sensed data; means for relaying said information from the satellite to a ground station and thence, via the Internet, to said center; signal-processing means at the center for processing the relayed information to effect one or more of geographical and tabular location display of the widely dispersed equipments and/or for optionally selected equipments, and optionally selected parameters, limits and conditions of said equipments, to provide processed information suitable to exercise management analysis of equipment utilization and operational efficiency; and means for communicating the processed information to the fleet manager for enabling improving efficiency of the equipment utilization and operation, wherein means is provided for operating the transponders periodically to provide a standard mode reporting schedule.

11. The apparatus of claim 10 wherein said communicating is effected over the Internet.

12. The apparatus of claimed 10 wherein such schedule is set for daily or several day reporting.

13. A vehicular equipment transponder-satellite communication link system wherein information sent by transponders of vehicular equipments of a widely geographically dispersed fleet of equipments is relayed by the satellite to a ground station and thence via the Internet to an information-processing center, the system comprising sensors for inputting to the transponders at each equipment of the fleet, locally sensed parameter data of temperature, run hours, fuel level, battery voltage and/or other equipment engine parameters; means operable upon each equipment transponder receiving GPS signals from the satellite, for causing the transponder to transmit to the satellite information regarding its location and said locally sensed data; means for relaying said information from the satellite to a ground station and thence, via the Internet, to said center; signal-processing means at the center for processing the relayed information to effect one or more of geographical and tabular location display of the widely dispersed equipments and/or for optionally selected equipments, and optionally selected parameters, limits and conditions of said equipments, to provide processed information suitable to exercise management analysis of equipment utilization and operational efficiency, and means for communicating the processed information to the fleet manager for enabling improving efficiency of the equipment utilization and operation, wherein the sensor of the fuel level is operable either or both when the equipment engine is running and when it is shut down.

14. The apparatus of claim 13 wherein, when the engine is shut down, the fuel level sensor is at floating potential, and isolation transformer means is provided for momentarily energizing the fuel level sensor.

15. A vehicular equipment transponder-satellite communication link system wherein information sent by transponders of vehicular equipments of a widely geographically dispersed fleet of equipments is relayed by the satellite to a ground station and thence via the Internet to an information-processing center, the system comprising sensors for inputting to the transponders at each equipment of the fleet, locally sensed parameter data of temperature, run hours, fuel level, battery voltage and/or other equipment engine parameters; means operable upon each equipment transponder receiving GPS signals from the satellite, for causing the transponder to transmit to the satellite information regarding its location and said locally sensed data; means for relaying said information from the satellite to a ground station and thence, via the Internet, to said center; signal-processing means at the center for processing the relayed information to effect one or more of geographical and tabular location display of the widely dispersed equipments and/or for optionally selected equipments, and optionally selected parameters, limits and conditions of said equipments, to provide processed information suitable to exercise management analysis of equipment utilization and operational efficiency; and means for communicating the processed information to the fleet manager for enabling improving efficiency of the equipment utilization and operation, wherein means is provided, operable upon special request, to send a signal to the satellite specially to interrogate the transponders.

16. A vehicular equipment transponder-satellite communication link system wherein information sent by transponders of vehicular equipments of a widely geographically dispersed fleet of equipments is relayed by the satellite to a ground station and thence via the Internet to an information-processing center, the system comprising sensors for inputting to the transponders at each equipment of the fleet, locally sensed parameter data of temperature, run hours, fuel level, battery voltage and/or other equipment engine parameters; means operable upon each equipment transponder receiving GPS signals from the satellite, for causing the transponder to transmit to the satellite information regarding its location and said locally sensed data; means for relaying said information from the satellite to a ground station and thence, via the Internet, to said center; signal-processing means at the center for processing the relayed information to effect one or more of geographical and tabular location display of the widely dispersed equipments and/or for optionally selected equipments, and optionally selected parameters, limits and conditions of said equipments, to provide processed information suitable to exercise management analysis of equipment utilization and operational efficiency; and means for communicating the processed information to the fleet manager for enabling improving efficiency of the equipment utilization and operation, wherein there is provided means for sensing unsafe and/or unauthorized action at the transponders, activated in an alarm mode so as to notify the center.

17. The apparatus of claim 16 wherein included in such unauthorized action are after-hours and off-site equipment use.

\* \* \* \* \*